United States Patent [19]

Wang

[11] Patent Number: 4,700,542
[45] Date of Patent: Oct. 20, 1987

[54] INTERNAL COMBUSTION ENGINES AND METHODS OF OPERATION

[76] Inventor: Lin-Shu Wang, 21 Hawks Nest Rd., Stony Brook, N.Y. 11790

[21] Appl. No.: 898,967

[22] Filed: Aug. 21, 1986

Related U.S. Application Data

[63] Continuation-in-part of Ser. No. 652,701, Sep. 21, 1984, Pat. No. 4,610,141.

[51] Int. Cl.⁴ .................... F02B 37/10; F02B 71/04; F02C 7/057
[52] U.S. Cl. .................... 60/598; 60/595; 60/608; 60/624; 60/39.163; 60/39.29
[58] Field of Search ........... 60/39.161, 39.163, 39.27, 60/39.29, 595, 598, 601, 603, 607, 608, 624; 123/561

[56] References Cited

U.S. PATENT DOCUMENTS

| | | | |
|---|---|---|---|
| 2,670,724 | 3/1954 | Reggio | 60/603 X |
| 2,970,433 | 2/1961 | Endres | 60/595 X |
| 2,988,884 | 6/1961 | Pouit | 60/39.27 X |
| 3,080,708 | 3/1963 | Carr . | |
| 3,173,242 | 3/1965 | Erickson | 60/601 |
| 3,255,586 | 6/1966 | Hennig et al. | 60/39.27 |
| 3,500,636 | 3/1970 | Craig . | |
| 3,584,459 | 6/1971 | Amann | 60/39.27 X |
| 3,971,208 | 7/1976 | Schwent | 60/39.27 X |
| 4,299,088 | 11/1981 | Rowen et al. | 60/39.27 |
| 4,452,043 | 6/1984 | Wallace | 60/624 X |

FOREIGN PATENT DOCUMENTS 3224006 12/1983 Fed. Rep. of Germany .
918852 11/1946 France .................... 60/595

Primary Examiner—Michael Koczo
Attorney, Agent, or Firm—Wolder, Gross & Yavner

[57] ABSTRACT

An internal combustion engine apparatus and method of operation includes the monitoring of the exhaust gas temperature and air-fuel ratio on a continuing basis. The exhaust gas temperature is compared to a stored value and compression of the input air is varied to cause the exhaust gas temperature to equal the stored value. By minimizing the exhaust gas temperature increased engine efficiency can be realized. The invention may be embodied in a variety of engine configurations, including piston and turbine systems.

17 Claims, 6 Drawing Figures

INTERNAL COMBUSTION ENGINES AND METHODS OF OPERATION

The present application is a continuation-in-part of application Ser. No. 652,701, filed Sept. 21, 1984, now U.S. Pat. No. 4,610,141.

The present invention relates to internal combustion engines and, in particular, to improved forms of such engines and methods of operation.

The overall energy balance of an engine or power plant may be expressed as work output=fuel heating value−heat rejection by coolant−energy loss of exhaust. Coolant heat rejection and exhaust energy loss cannot both be eliminated in a power production cycle. Common internal combustion engines—the gas turbine engine, the gasoline engine and the diesel engine, are based upon the ideal cycles of the Brayton cycle, the Otto cycle and the Diesel cycle respectively. These cycles share the common characteristics of discharging exhaust gas at high temperature and requiring, in principle, no heat rejection by coolant. In practice, of course, coolants are used, especially in the cases of the gasoline and diesel engines, to prevent material overheating. Such cooling is required by temperature limits of the engine materials, not by the thermodynamic principles of the ideal engine cycle utilized. Such coolants may be reduced or eliminated with the continuing improvement in materials.

In general, thermodynamic principles permit the assertion that internal combustion engine designs which minimize exhaust energy loss are superior in fuel economy to such engine designs which minimize heat rejection by coolant. Accordingly, there have been numerous attempts made to design internal combustion engines which minimize the exhaust energy loss. These include the addition of exhaust gas driven power turbines for additional power output. Other proposals call for the adding of an inverted open cycle gas turbine as disclosed in U.S. Pat. No. 2,898,731 or the use of an "exhaust gas power extractor" to an Otto or Diesel cycle engine, as disclosed in Great Britain Pat. No. 1,521,265. In each of such cases there can be an increased power output under certain operating conditions. In general, however, such improvement in efficiency decreases or disappears as operating conditions are varied. None of these methods provide a continuous, systematic method to secure prescribed low values in exhaust gas temperature and accordingly a significant increase in efficiency over a meaningful operation range.

It is accordingly a purpose of the present invention to provide a method for the operation of internal combustion engines which minimizes energy loss through exhaust gas emission.

A further object of the present invention is to provide a method for the operation of internal combustion engines in which exhaust gas temperature may be maintained at corresponding given low values over a range of operating conditions.

Yet another purpose of the present invention is to provide a method for the operation of internal combustion engines in which the pressure of combustion input air is continuously varied by supercharging to obtain improved operation.

Yet a further purpose of the present invention is to provide internal combustion engines which provide improved perfomance over a range of operating conditions.

A still further purpose of the present invention is to provide such an engine in which exhaust temperatures are maintained at desired low levels over a range of operating conditions.

Another purpose of the present invention is to provide an engine in which the above method objects may be carried out.

In furtherance of the above and other objects and purposes, the present invention comprises an internal combustion engine having means for varying, on a continuous basis, the pressure of the air of the air-fuel mixture entering into the primary, high pressure shaft compression means. The temperature of the exhaust gases are monitored along with the air-fuel mixture ratio. Compression of the input air is adjusted as required to maintain the exhaust gas temperature at a desired low value corresponding to the air-fuel ratio. The combustion process of the engine may be a part of an Otto, Diesel of Brayton cycle, embodied within a spark ignition or compression ignition piston cylinder or within a gas turbine.

In general, an internal combustion engine of the present invention may be characterized by the existence of a pair of generalized high and low temperature/pressure operation shafts. The high pressure shaft is directly coupled with the combustion chamber, while the low pressure shaft is used to maintain exhaust gas temperature at the desired level. In addition, the low pressure shaft may produce a net work output which can be coupled to an output shaft to do useful work.

A greater understanding of the present invention will be accomplished upon consideration of the following detailed description of preferred, but nonetheless illustrative embodiments of the present invention when taken in conjunction with the annexed drawings, wherein FIG. 1 is a temperature-entropy diagram of a cycle of an engine of the present invention;

Figure 1:
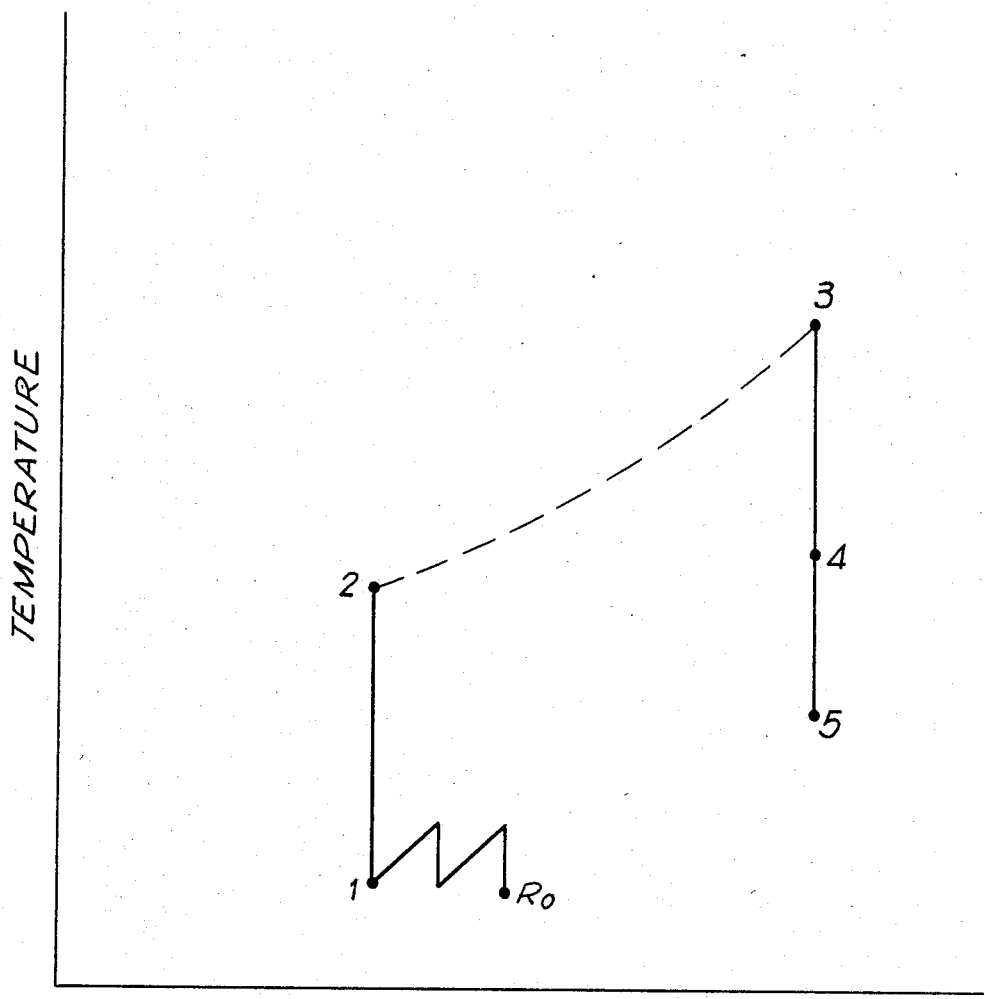

FIG. 1 represents a generalized temperature-entropy diagram for internal combustion engines of the type of the present invention. The portion of the diagram between points Ro and 1 represents compression or supercharging of the input air, where the pressure of the air is increased while the temperature of the air is maintained at a relative constant level by intercooling between the compression phases.

The portion of the diagram between points 1 and 2 represents primary compression of the fuel-air mixture, whether within a cylinder as in a diesel engine or within the main compressor of a gas turbine engine.

The portion of the diagram between points 2 and 3 represents combustion of the air-fuel mixture, while the portion of the diagram between points 3 and 5 represent the expansion of the exhaust gas. Point 4 represents the state of the exhaust gas from a simple engine without supercharging, as the pressure of point 4 equals that of point 1. Because of supercharging the exhaust gas temperature can be lowered to point 5, permitting additional work to be extracted from the system and improving engine performance and efficiency.

Figure 2:
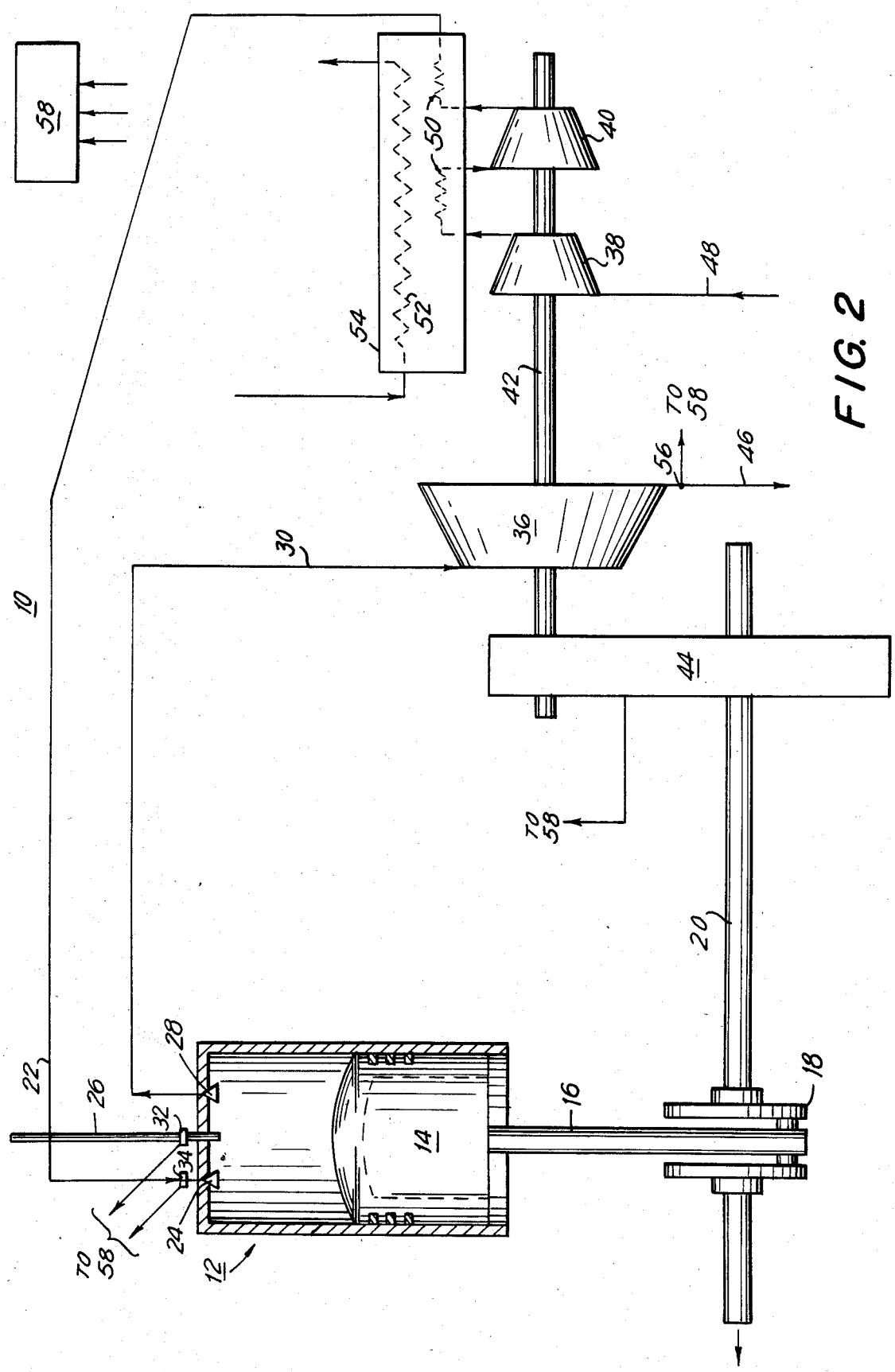
FIG. 2 is a representation of a piston/turbine engine embodying the present invention.

As may be seen in FIG. 2, the present invention may firstly be embodied in a piston/turbine compound engine. As shown therein, engine 10 includes one or more cylinders 12, each containing a reciprocating piston 14 mounted to piston arm 16 suitably mounted to crank assembly 18 on crankshaft 20, which may be characterized as a high pressure shaft, as it is directly coupled to the combustion chamber of cylinder 12. An oxidizing fluid, such as ambient air, is introduced into cylinder 12 through line 22 terminating in inlet valve 24. Fuel is introduced through line 26, and the hot exhaust gases are exhausted through exhaust valve 28 into line 30. The air-fuel ratio is monitored by flow sensors 32 and 34 on lines 22 and 26.

Ignition of the air-fuel mixture may be by compression or spark. Piston 14 provides primary, essentially adiabatic compression to the air-fuel mixture, which after combustion is converted to an exhaust gas mixture which expands adiabatically within the cylinder, driving the piston downward and causing rotation of crankshaft 20. In this embodiment crankshaft 20 also serves as an output shaft from which output work may be derived.

Turbine unit 36, along with compressor units 38 and 40, are mounted on common low pressure shaft 42, which is operatively joined to crankshaft 20 by variable transmission 44. Exhaust line 30 directs the exhaust gases to the input side of turbine 36, while line 46 couples the exhaust from turbine 36 to the atmosphere.

External air is drawn through input line 48 through compressor stages 38 and 40, each of which is provided with a cooling coil 50 in a heat transferring relationship with line 52 in interstage cooling unit 54. The combination of compressors 38 and 40 and cooler 54 subjects the external air to approximately isothermal compression, after which the compressed external air is directed by input line 22 to cylinder 12. Temperature sensor 56 is mounted on exhaust line 46 to monitor the temperature of the exhaust gases therein, and is coupled to microprocessor 58, along with air-fuel ratio sensors 32, 34. The gearing of transmission 44 is also under the supervision and control of the microprocessor.

In operation the air-fuel mixture is combined and ignited in cylinder 12 in the conventional manner, driving piston 14 and producing output work on shaft 20. The hot exhaust gases are directed through turbine 36, which both drives compressor stages 38 and 40 and provides a net torque output to crankshaft 20 through transmission 44. Because the working fluid of turbine 36 is at a higher temperature than that of compressors 38 and 40 and because the pressure drop across the turbine is normally greater than that across the compressors, there is a net work output which can be coupled to the crankshaft. Temperature sensor 56 monitors the temperature of the exhaust gases exiting from turbine 36, and passes this data to microprocessor 58, which by controlling the gearing of transmission 44 controls the rate of rotation of low pressure shaft 42. As this rate of rotation controls the extent of compression of compressors 38 and 40, external air entering the compressor stages through inlet 48 is subject to variable compression.

As there is a relationship between input air compression (supercharging), exhaust gas temperature and engine efficiency, microprocessor 58 must be programmed with the required reference temperature corresponding to optimum engine efficiency at various engine air-fuel ratios. This may be done by testing the engine at a given air-fuel ratio and monitoring engine efficiency as compression is varied. As compression is varied the exhaust temperature also changes. As exhaust temperatures decrease efficiency increases to a maximum and then decreases again.

The collection of temperature values corresponding to optimum efficiencies over the desired range of air-fuel ratios intended to be utilized creates the data base for the microprocessor. Such a data base must be derived on a custom basis for a given engine. Initial computer simulation of a gas turbine model indicates that exhaust temperatures can be expected in the range of 525 to 620 degrees Kelvin. Since the data is derived on a custom basis the exhaust temperature may be monitored at any place in the exhaust stream path.

Accordingly, by continuously monitoring the temperature of the exhaust gases leaving turbine 36 and controlling the extent of compression, it is possible to maintain the temperature of the exhaust gases at the desired low range, thus maintaining high engine efficiency over the range of air-fuel ratios. In seeking optimum performance, however, the condensation points of the exhaust gas components must be considered to avoid the possibly damaging effects of condensation within the engine, especially when temperature monitoring takes place at a point beyond which the exhaust is still subject to temperature decrease.

Figure 3:
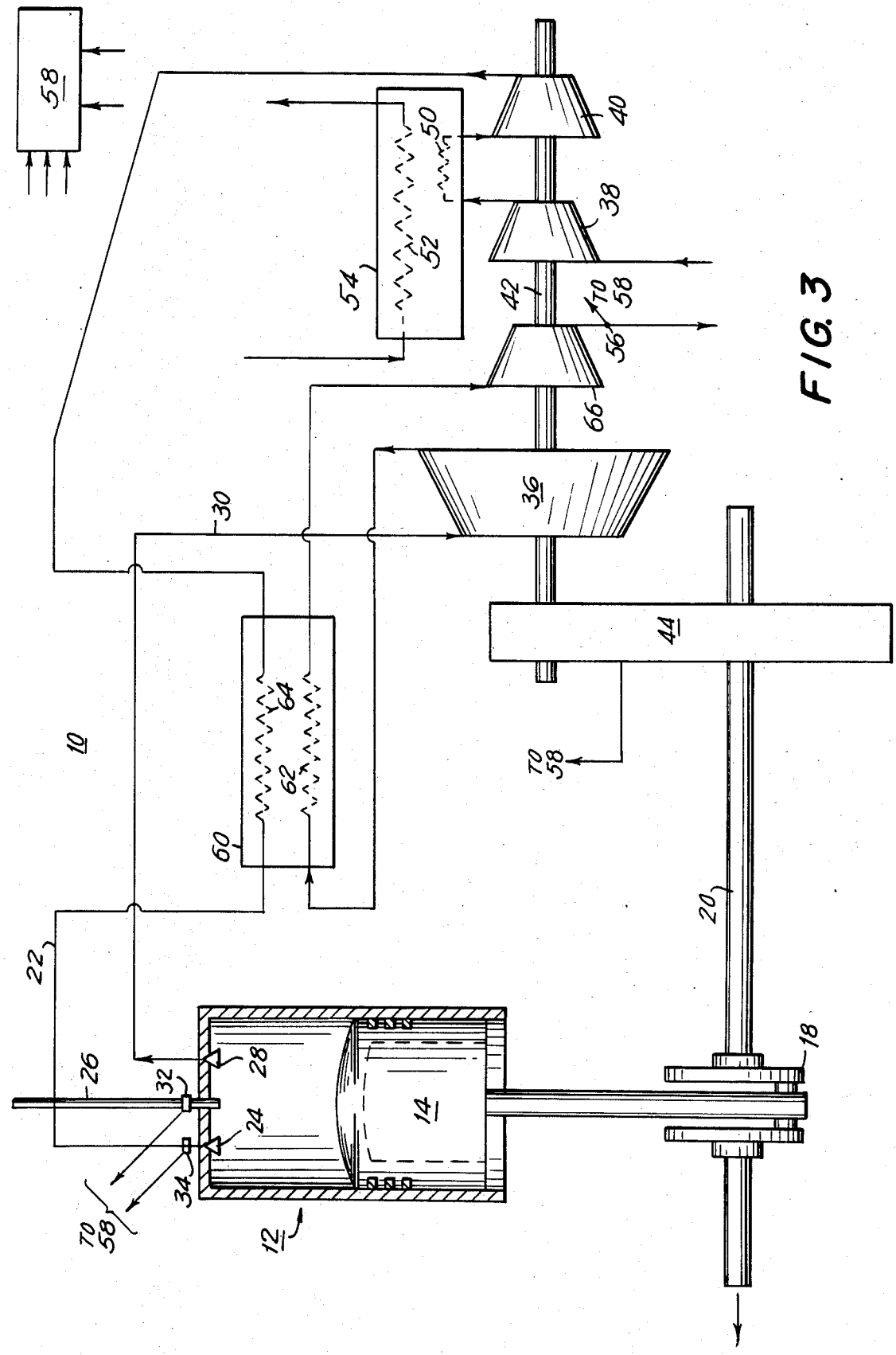
FIG. 3 is a representation of the engine of FIG. 2 employing regeneration heating means for the input air in addition to compression.

As the exhaust gases may still be at a relatively high temperature opposed to as ambient upon exhaust, an alternative to the embodiment just disclosed includes the provision for preheating of the external air prior to admission into the cylinder by use of the exhaust gas heat energy. As seen in FIG. 3, this may be accomplished by the use of a regenerative preheater 60 which includes passageways 62 and 64 aligned in a heat transferring relationship. The exhaust gases, after exiting from turbine 36, are passed through passageway 62 within the heat exchanger 60, thereby transferring a portion of their remaining heat energy to the compressed or supercharged external air passing through passageway 64. The exhaust gases may then be passed through compressor 66 on shaft 42, operating as a suction device, which provides a measure of further efficiency in the flow through turbine 36, prior to being exhausted to the atmosphere through line 46. As the temperature of the exhaust gases exiting from turbine 36 is above that of the gases entering compressor suction device 66 due to the use of preheater 60, the work required to drive compressor suction device 66 is less than the net additional work extracted by turbine 36 from the exhaust gas stream due to the lowering of its exhaust pressure by suction device 66. Accordingly, additional efficiency may be realized. It is to be noted that, in this embodiment, second intercooler stage 50 is not used, since it is not necessary to maintain the compressed air at its initial temperature.

Figure 4:
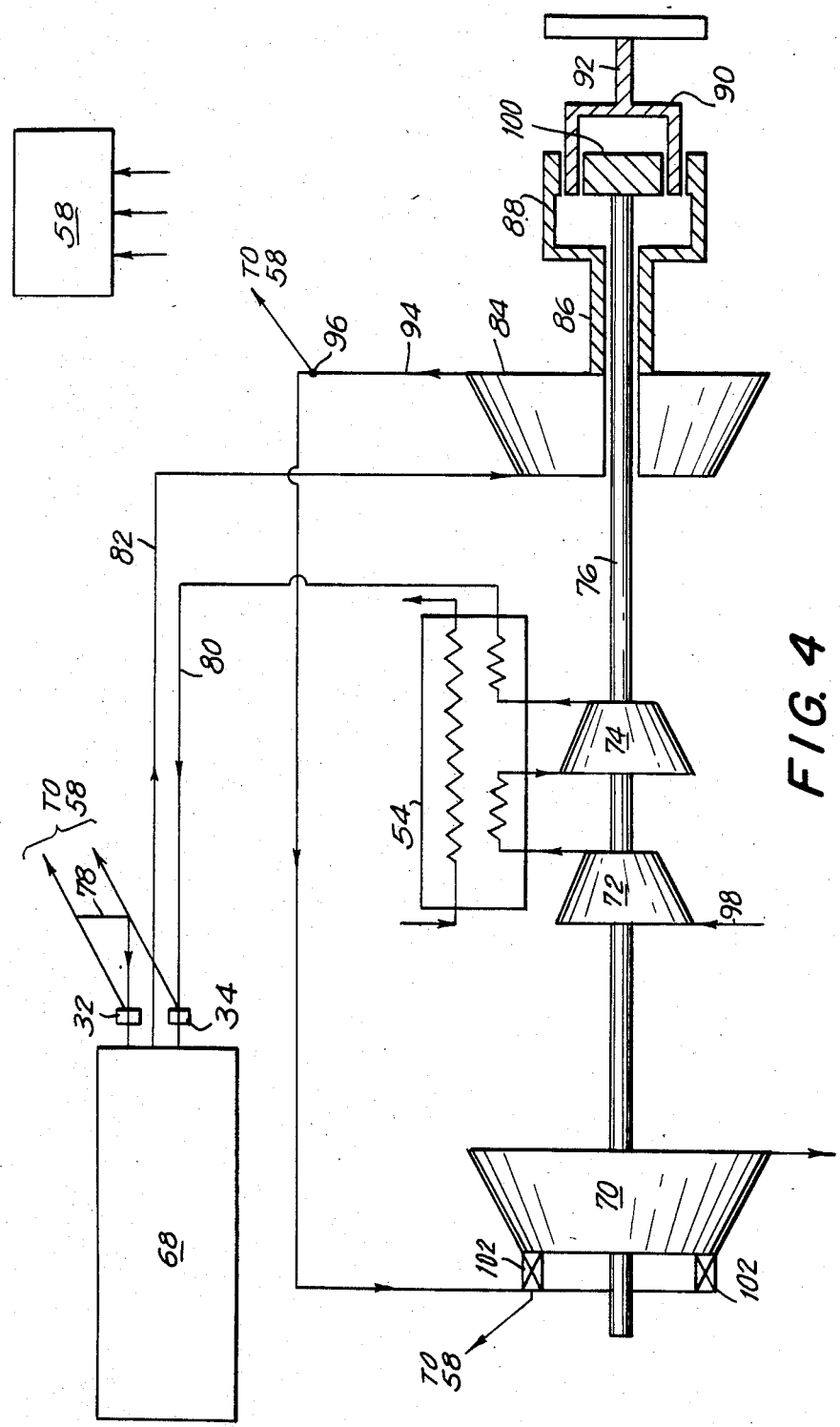
FIG. 4 is a representation of a gas turbine engine utilizing a free piston gasifier embodying the present invention.

The present invention may also be embodied within a gas turbine engine utilizing a free piston gasifier, as depicted in FIG. 4. In that figure free piston gasifier 68 defines a "high pressure shaft" although in actuality the gasifier is a "zero power" device and hence without an output shaft. The gasifier operates, however, at high pressure. Turbine 70 and compressors 72 and 74 are mounted on common low pressure second shaft 76 and operate at relatively low pressure levels.

In this embodiment fuel enters the gasifier through line 78 while air enters through line 80, their flow rates being monitored by the sensors 32 and 34 coupled to the microprocessor 58. The air-fuel mixture is ignited and raised to a high temperature and pressure within gasifier 68 in the manner known in the art, with such high pressure and temperature exhaust exiting through line 82 to drive turbine 84. Turbine 84 rotates on shaft 86, coaxial with low pressure shaft 76. It is this shaft 86 from which work output is primarily derived. Shaft 86 is provided with ring gear 88 which engages with planetary gear unit 90 which is coupled to output drive shaft 92. Exhaust gas exiting from turbine 84 passes through line 94, and is temperature monitored by sensor 96. The exhaust gas then is used to drive turbine 70, which provides the drive for dual intercooled compressor units 72 and 74, which obtain external air through inlet line 98, compress the air, and provide it to free piston gasifier 68 through input line 80. Low pressure shaft 76 is coupled to the output of turbine 84 by sun gear 100 meshing with the interior of planetary gear unit 90. In this embodiment variable turbine input nozzles 102 on turbine 70, along with temperature sensor 96 and flow sensors 32 and 34, are under microprocessor 58 control, such that the speed of rotation of low pressure shaft 76 and accordingly the extent of compression for the external air by compressors 72 and 74 can be continuously monitored and adjusted to maintain the exhaust temperature, and accordingly engine efficiency, at the desired level. Because the control of variable nozzles 102 affect the pressure in line 94, their operation necessarily varies the output of turbine 84 on shaft 86. As in the previous embodiments testing or simulation of the engine is required to obtain the necessary engine efficiency, input air compression and exhaust temperature relationships for proper microprocessor operation and control.

Figure 5:
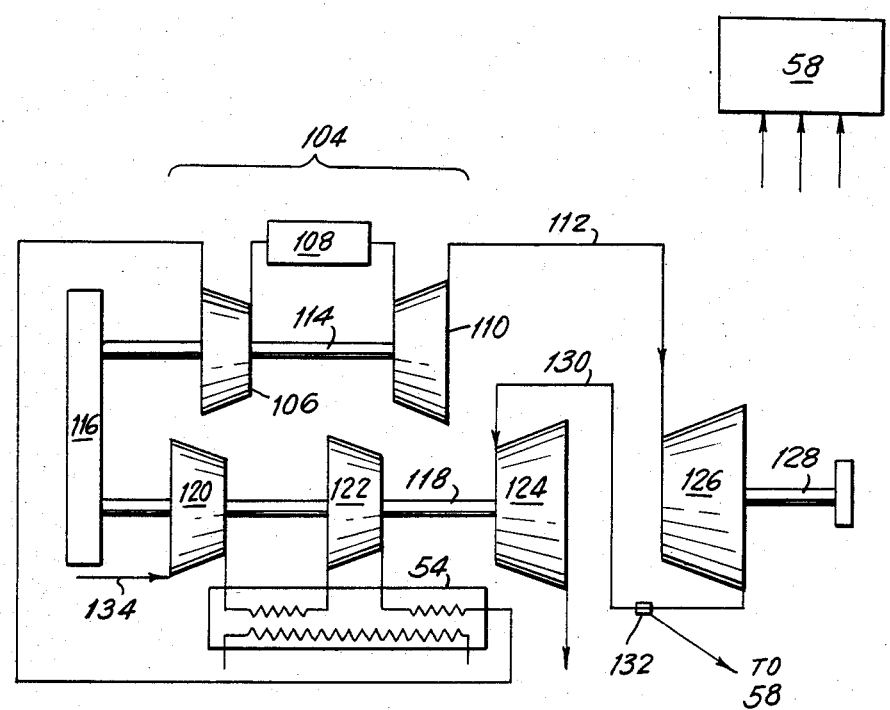
FIG. 5 is a representation of a pure gas turbine engine embodying the present invention.

The present invention may also be embodied in a pure gas turbine engine, as depicted in FIG. 5. In this embodiment typical gas turbine unit 104, comprising compressor 106, combustion chamber 108 and turbine 110, yield a high temperature and pressure exhaust gas stream on line 112. Compressor 106 and turbine 110 are mounted on common high pressure shaft 114 which is coupled through transmission 116 to low pressure shaft 118, upon which compressor units 120 and 122, along with turbine 124, are mounted. The exhaust gases in line 112 drive free turbine 126 connected to power output drive shaft 128. The temperature of the exhaust from turbine 126 on line 130 is monitored by sensor 132 before passing through turbine 124 to drive compressors 120, 122 and being exhausted to the atmosphere. Once again, sensor 132, transmission 116, as well as the air-fuel ratio sensors (not shown) are under microprocessor 58 control, such that the rotation ratio between high pressure shaft 114 and low pressure shaft 118 can be adjusted to permit the variable compression of inlet air entering through line 134 to compressors 120 and 122 and fed to turbine unit 104 to be varied as required to maintain the exhaust temperature on line 130 and engine efficiency at the desired values.

Figure 6:
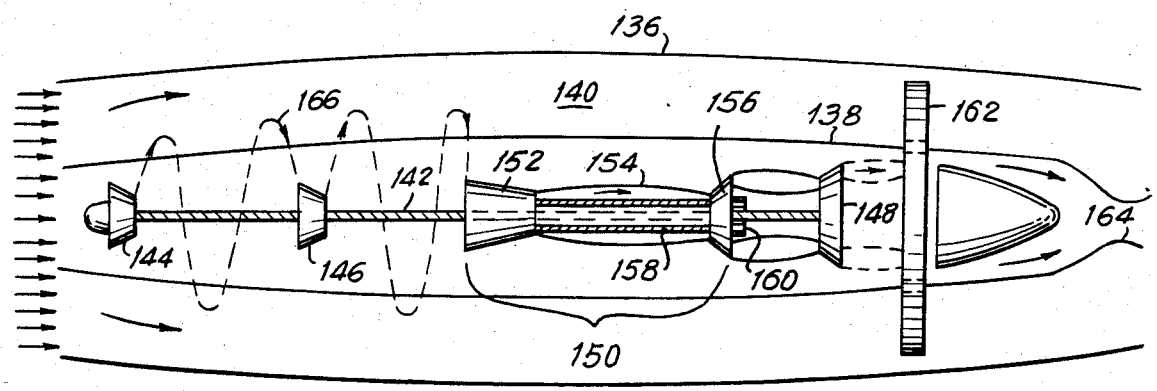
FIG. 6 is a representation of a two spool jet engine embodying the present invention.

The pure gas turbine embodiment of the present invention may also be embodied in the form of a dual shaft jet engine, as depicted in FIG. 6. As shown therein, engine nacelle 136 contains inner core casing 138, which defines annular air by-pass ring 140 and supports the engine elements. Within core casing 138 low pressure shaft 142, bearing compressors 144 and 146 and low pressure drive turbine 148, is mounted coaxially with the elements of the primary gas turbine unit 150, comprising high pressure compressor 152, combustion chamber 154 and high pressure turbine 156. In conventional fashion turbine 156 drives compressor 152 by high pressure shaft 158, which is coaxial about low pressure shaft 142. High pressure shaft 158 is joined to low pressure shaft 142 by variable transmission 160. Exhaust gases exiting from high pressure turbine unit 156 drive low pressure turbine 148, and thereafter may drive a turbo-fan 162 in the conventional manner. The exhaust gas may then be expanded through exhaust nozzle section 164 as is generally known in the art. The temperature of the exhaust gases may be monitored at nozzle section 164, with transmission 160, as well as the exhaust temperature and air-fuel flow sensors (not shown), again being under microprocessor control. In this embodiment intercooling between compressors 144, 146 and 152 is accomplished by helical cooling coils 166, which extend into annular by-pass ring 140. Intercooler coils 166 may be provided with cooling fins or other means to provide a larger surface area for cooling effects of the by-pass air.

I claim:

1. The method for the operation of an internal combustion engine having means in which an air-fuel input of variable ratio is combined and ignited to produce a high temperature and pressure exhaust gas stream, comprising the steps of:
   (a) directing the exhaust gases through expansion means to extract work therefrom;
   (b) monitoring on a continuing basis the air-fuel ratio and the temperature of said exhaust gases after exiting from said expansion means;
   (c) continuously comparing the temperature of said exhaust gases to predetermined standards representing given high values of engine efficiency at the air-fuel ratios to create a control signal relating to said difference; and
   (d) continuously variably compressing the input air of said air-fuel mixture in response to said control signal
such that said exhaust gas temperature is maintained at said predetermined standard during engine operation.

2. The method of claim 1 wherein said step of variably compressing said input air comprises passing said input air through first and second compressor means having intercooler means.

3. The method of claim 1 wherein the step of variably compressing the input air comprises passing said exhaust gas exiting from said expansion means through turbine means and driving variable compressor means by said turbine means.

4. The method of claim 3 wherein said variable compression step comprises varying the rotation rate of said turbine means.

5. The method of claim 1 further comprising the step of preheating said input air after said input air is compressed.

6. The method of claim 5 wherein said preheating is accomplished by heat transfer means between said exhaust gases and said input air.

7. An improved internal combustion engine comprising:
   means for producing a high temperature and pressure exhaust gas stream from an air-fuel input mixture said production means comprising air and fuel input means;

output means coupled to said exhaust gas production means for extracting output work from said exhaust gas stream;

variable compressor means drive coupled to said exhaust gas production means for varying the pressure of the air portion of the input air-fuel mixture, said compressor means having an air input and an output coupled to said air input means;

sensing means adapted and arranged for continuous monitoring of the temperature of said exhaust gas stream after passing through said output means and for monitoring the input air-fuel ratio at said air and fuel input means;

and means for providing a continuous control signal for varying the compression of the input air by said variable compressor means based upon the temperature difference between the monitored temperature of said exhaust gas stream and a predetermined reference temperature for a given sensed air-fuel ratio such that said monitored exhaust gas temperature is continuously maintained at said predetermined reference temperature during engine operation, said predetermined reference temperature corresponding to a predetermined engine efficiency at a given air-fuel ratio.

8. The apparatus of claim 7 wherein said variable compressor means is drive coupled to said exhaust gas stream by turbine means.

9. The apparatus of claim 7 wherein said means for providing the high temperature and pressure exhaust gas stream comprises a gas turbine having compressor, combustion and compressor drive means.

10. The apparatus of claim 7 wherein said means for providing the high temperature and pressure exhaust gas stream is a free piston gasifier.

11. The apparatus of claim 7 wherein said means for providing the high temperature and pressure exhaust gas stream is a piston engine.

12. The apparatus of claim 8 wherein said variable compressor means and said turbine means are mounted on a single shaft.

13. The apparatus of claim 12 wherein said single shaft is coupled to said means for producing the high temperature and pressure exhaust gas stream.

14. The apparatus of claim 13 wherein said single shaft is coupled to said production means by a variable ratio transmission.

15. The apparatus of claim 14 wherein said control signal varies said transmission ratio to vary the compression of said variable compressor means.

16. The apparatus of claim 7 wherein said variable compressor means comprises first and second compressor means having intercooler means.

17. The apparatus of claim 16 wherein said intercooler means comprise helical cooling coils mounted for convective cooling by by-pass air.

* * * * *